US011272086B2

(12) United States Patent
Jiang et al.

(10) Patent No.: US 11,272,086 B2
(45) Date of Patent: Mar. 8, 2022

(54) CAMERA SYSTEM, VEHICLE AND METHOD FOR CONFIGURING LIGHT SOURCE OF CAMERA SYSTEM

(71) Applicants: Yu-Sian Jiang, Austin, TX (US); Mu-Jen Huang, Taipei (TW)

(72) Inventors: Yu-Sian Jiang, Austin, TX (US); Mu-Jen Huang, Taipei (TW)

( * ) Notice: Subject to any disclaimer, the term of this patent is extended or adjusted under 35 U.S.C. 154(b) by 289 days.

(21) Appl. No.: 16/737,897

(22) Filed: Jan. 8, 2020

(65) Prior Publication Data

US 2020/0221000 A1   Jul. 9, 2020

Related U.S. Application Data

(60) Provisional application No. 62/789,532, filed on Jan. 8, 2019.

(51) Int. Cl.
*H04N 5/225* (2006.01)
*H04N 5/232* (2006.01)
*G02B 27/01* (2006.01)
*B60K 35/00* (2006.01)
*B60R 11/04* (2006.01)

(52) U.S. Cl.
CPC .......... *H04N 5/2256* (2013.01); *B60K 35/00* (2013.01); *B60R 11/04* (2013.01); *G02B 27/0172* (2013.01); *H04N 5/23229* (2013.01); *B60K 2370/21* (2019.05); *B60K 2370/349* (2019.05); *B60R 2300/308* (2013.01); *G02B 2027/0138* (2013.01); *G02B 2027/0178* (2013.01)

(58) Field of Classification Search
CPC .. H04N 5/23229; H04N 5/217; H04N 5/2354; H04N 5/2351; H04N 5/2256; H04N 7/18; B60K 35/00; B60K 2370/349; B60K 2370/33; B60K 2370/149; B60K 2370/176; B60K 2370/21; B60K 37/06; B60R 11/04; B60R 2300/308; G02B 27/0172; G02B 2027/0138
See application file for complete search history.

(56) References Cited

U.S. PATENT DOCUMENTS

2015/0253428 A1* 9/2015 Holz ................ G01S 17/36
356/5.01
2017/0041575 A1* 2/2017 Chen ................ H04N 5/2354

* cited by examiner

*Primary Examiner* — Nelson D. Hernández Hernández

(57) ABSTRACT

A camera system is provided. The camera system includes an image sensor, at least one light source, and a processing unit. The image sensor is configured to capture a plurality of images. The processing unit is configured to perform the following instructions. A plurality of reflection values on at least one subject in the captured images is acquired. A relationship between a luminance level of the light sources and a reflection level on the at least one subject is obtained. A luminance configuration is determined according to the relationship between the luminance level of the light sources and the reflection level on the at least one subject. A luminous power of at least one of the light sources is adjusted according to the luminance configuration.

20 Claims, 10 Drawing Sheets

CAMERA SYSTEM, VEHICLE AND METHOD FOR CONFIGURING LIGHT SOURCE OF CAMERA SYSTEM

CROSS REFERENCE

This application claims the benefit and priority to of U.S. Provisional Application Ser. No. 62/789,532, filed on Jan. 8, 2019, and entitled "SYSTEM AND METHOD OF GLARE ELIMINATION", which is incorporated herein by reference in its entirety.

FIELD

The present disclosure generally relates to a camera system, a vehicle having a camera system and method for configuring light source on a camera system.

BACKGROUND

In recent years, face detection related application has become increasingly popular, and it relied on facial features extraction from the captured images. Conventionally, in order to allow the night vision or insufficient lighting environment, the camera system may contain a illumination unit such as an infrared illuminator or to provide a light source or flashlight for illuminating the face. However, the illumination unit may induce glare in photos. Specifically, glare in photos is caused by light bouncing off a reflective surface at an angle and into the camera. In some scenarios, eye related detection or recognition which requires the accurate information (e.g., position, size, boundaries) of the eye, iris or pupil may be severely affected by the glare. For instance, as shown in FIG. 1, when a camera 10 captures a facial image of a person who is wearing glasses 30, the flashlight emitted by the illuminator or flash unit 20 falls on the surface of the glasses 30 and then reflects into the camera 10. Consequently, a glare 70 is captured on the image. Since the glare may appear near the eyes, the position, size, or boundaries of the eye/iris/pupil may not be clearly detected or identified. As a result, any eye detection/recognition or other recognitions therefore relied upon may fail. Moreover, the accuracy rate of the eye recognition or other recognitions relied upon may be affected by the glare.

SUMMARY

In one aspect of the present disclosure, a camera system is provided. The camera system includes an image sensor, at least one light source, and a processing unit. The image sensor is configured to capture a plurality of images. The processing unit is configured to perform the following instructions. A plurality of reflection values on at least one subject in the captured images is acquired. A relationship between a luminance level of the light sources and a reflection level on the at least one subject is obtained. A luminance configuration is determined according to the relationship between the luminance level of the light sources and the reflection level on the at least one subject. A luminous power of at least one of the light sources is adjusted according to the luminance configuration.

In another aspect of the present disclosure, a method for configuring light source of a camera system is provided. The method includes the following actions. A plurality of images are captured. A plurality of reflection values on at least one subject in the captured images is acquired. A relationship between a luminance level of the light sources and a reflection level on the at least one subject is obtained. A luminance configuration is determined according to the relationship between the luminance level of the light sources and the reflection level on the at least one subject. A luminous power of at least one of the light sources is adjusted according to the luminance configuration.

In yet another aspect of the present disclosure, a vehicle is provided. The vehicle includes an image sensor, at least one light source, and a processing unit. The image sensor is configured to capture a plurality of images. The processing unit is configured to perform the following instructions. A plurality of reflection values on at least one subject in the captured images is acquired. A relationship between a luminance level of the light sources and a reflection level on the at least one subject is obtained. A luminance configuration is determined according to the relationship between the luminance level of the light sources and the reflection level on the at least one subject. A luminous power of at least one of the light sources is adjusted according to the luminance configuration.

DETAILED DESCRIPTION

Figure 1:
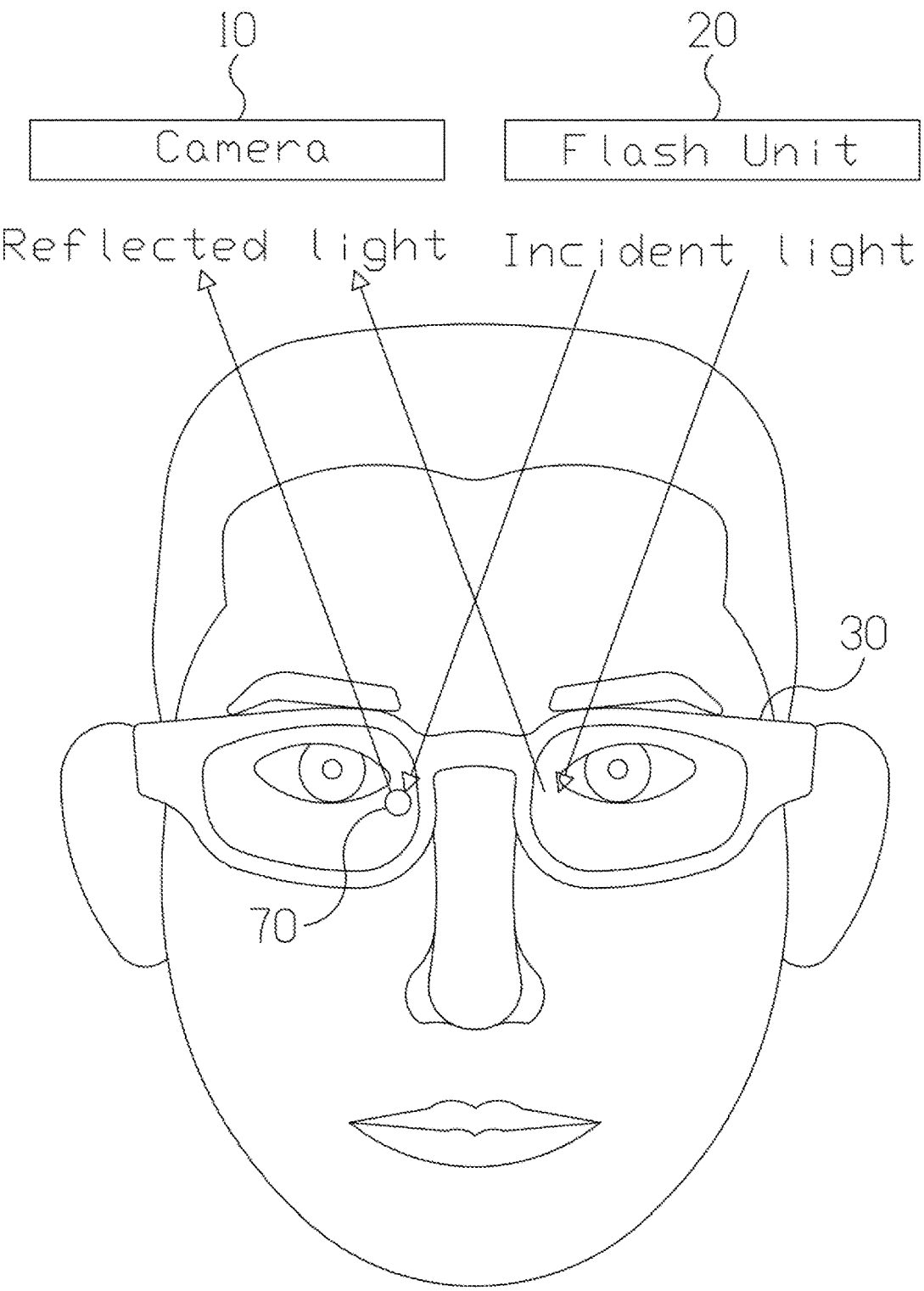
FIG. 1 is a schematic diagram of a glare appears on the glasses due to the flash unit of a camera system.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

Figure 2:
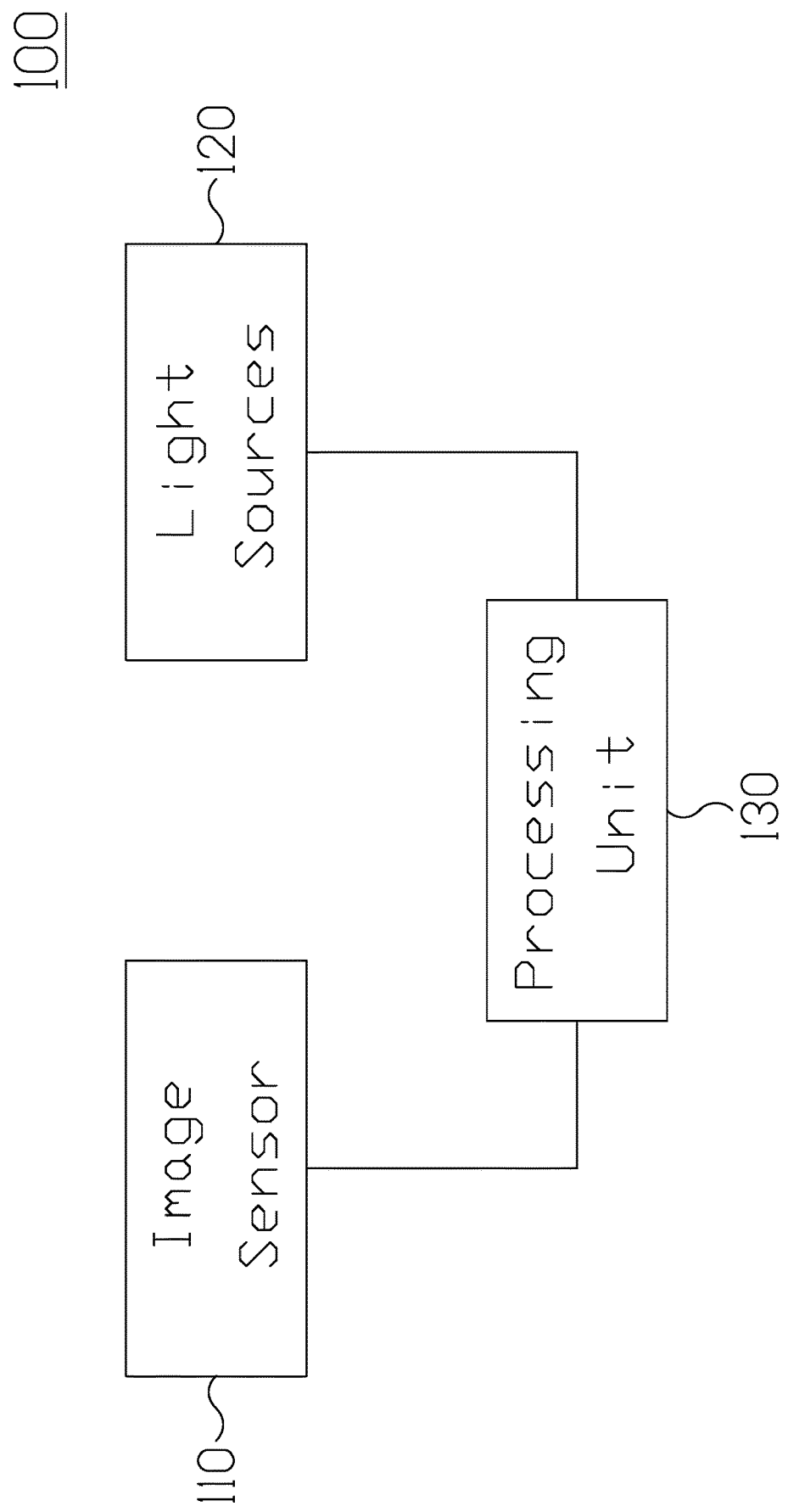
FIG. 2 is a block diagram of a camera system 100 according to an embodiment of the present disclosure.

A camera system is proposed in this disclosure to resolve the above issues. FIG. 2 is a block diagram of a camera system 100 according to an embodiment of the present disclosure. The camera system 100 includes an image sensor 110, multiple light sources 120 and a processing unit 130.

The image sensor 110 is configured to capture images. In one implementation, the image sensor 110 may be an RGB color sensor or an infrared (IR) sensor. The image sensors could be the charge-coupled device (CCD) or the active-pixel sensor (CMOS sensor).

The light sources 120 is configured to illuminate a subject to capture by the image sensor 110. In one implementation, the light sources 120 may be visible light sources, or IR light sources.

The processing unit 130 is coupled to the image sensor 110 and the light sources 120. The processing unit 130 may be a hardware module comprising one or more central processing unit (CPU), microcontroller(s), ASIC, or a combination of above but is not limited thereof. The processing unit 130 may process data and instructions. In one embodiment, the processing unit 130 is configured to identify the captured image, render images and perform image processing and biometric recognition on the captured images. In another embodiment, the processing unit 130 is configured to control the luminance of the light sources 120.

The camera system 100 further includes a lens unit configured to provide an optical path to the image sensor 110. The camera system may further include filters, circuitry or other components familiar to those of skill in the art and thus is omitted.

In one embodiment, a vehicle is equipped with the camera system 100. The image sensor 110, the light sources 120, and the processing unit 130 may be integrated in a device. Alternatively, the image sensor 110, the light sources 120, and the processing unit 130 is disposed separately inside a vehicle, and each component may communicate each other via physical connection or wireless connection. In one implementation, the processing unit 130 is one of the functional modules of an automotive electronic control unit (ECU).

In the present disclosure, one way to resolve the issue of glare is by adjusting the arrangement of the camera system 100 (including the light sources 120 and the image sensor 110). Precisely, a forbidden region where the camera system 100 should not be disposed within is defined as follow.

Figure 3A:
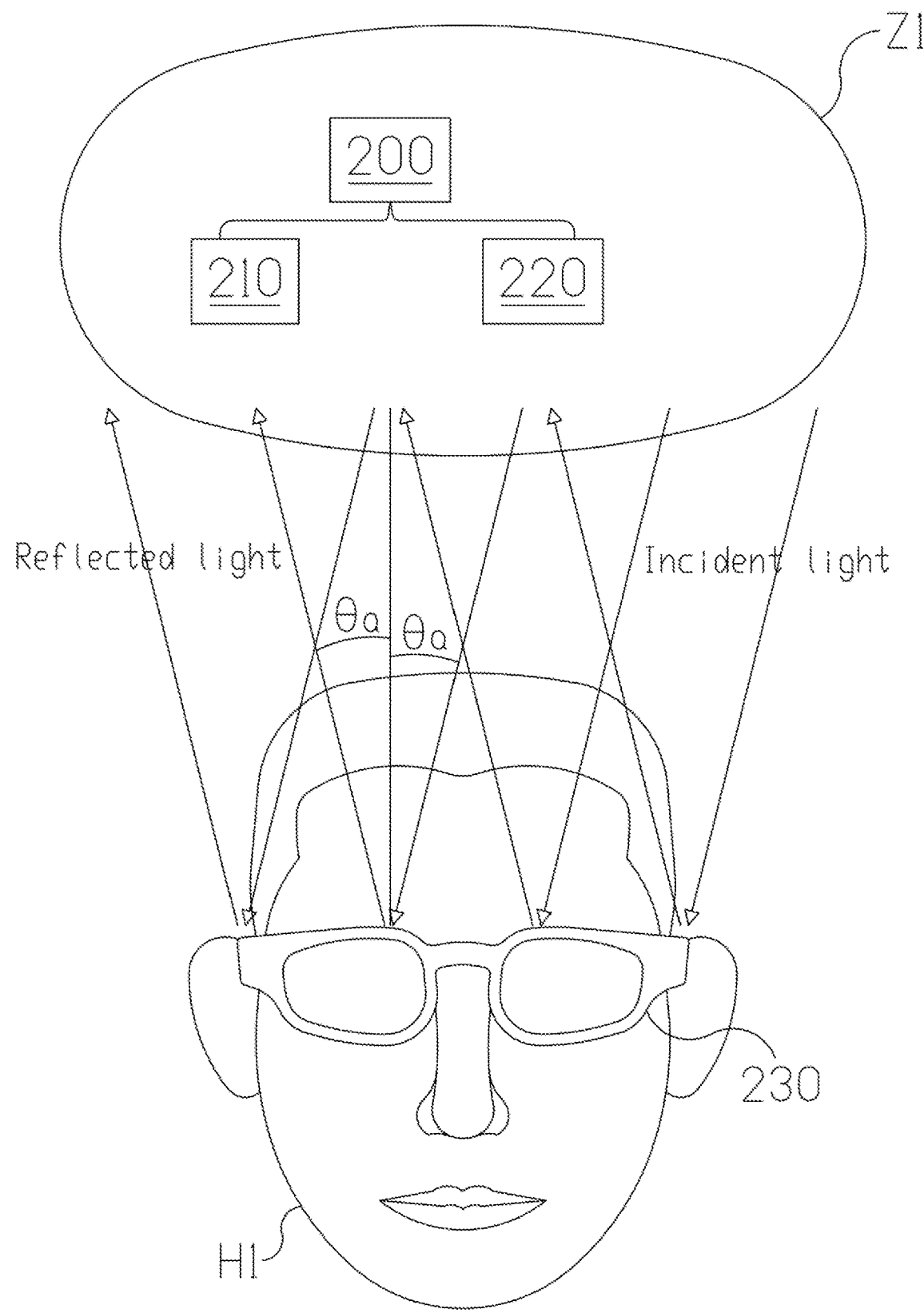
FIGS. 3A-3C are schematic diagrams showing various forbidden regions of a camera system according to an embodiment of the present disclosure.

FIG. 3A is a schematic diagram showing a forbidden region Z1 of a camera system 200 according to an embodiment of the present disclosure. When the camera system 200 is disposed within the forbidden region, a glare may occur on the captured images. As illustrated, in order to capture a clearer image, the light source 220 is used to illuminate the subject to be captured (e.g., a face of a person). However, some lights emitted from the light source 220 may reflect directly to the image sensor 210 and thus causes glare on the facial image. As shown in FIG. 3A, the incident light emitted from the light source 220 falls on the glasses 230 with an incident angle $\theta_a$ and then reflects to the image sensor 210 with the reflection angle $\theta_a$. The existence of glare on the glasses 230 makes the determination of the person's eyes difficult. Therefore, the arrangement of the camera system 200 in the forbidden region Z1 should be avoided.

People familiar with optics should understand that the glare (reflection) is dependent to the surface of the glasses 230 and the relative positions of the light source 220, the image sensor 210 and the glasses 230. Specifically, the incident angle $\theta_a$ could be calculated according to the distance between the image sensor 210 and the light source 20 (which is usually fixed and on the same plane) and the distance between the glasses 230 and the camera plane. Therefore, based on the position and the size of the glasses 230 and the distance between the image sensor 210 and the light source 220 (or the positions of the image sensor 210 and the light source 220, or the angle $\theta_a$), the forbidden region Z1 could be defined.

Figure 3B:
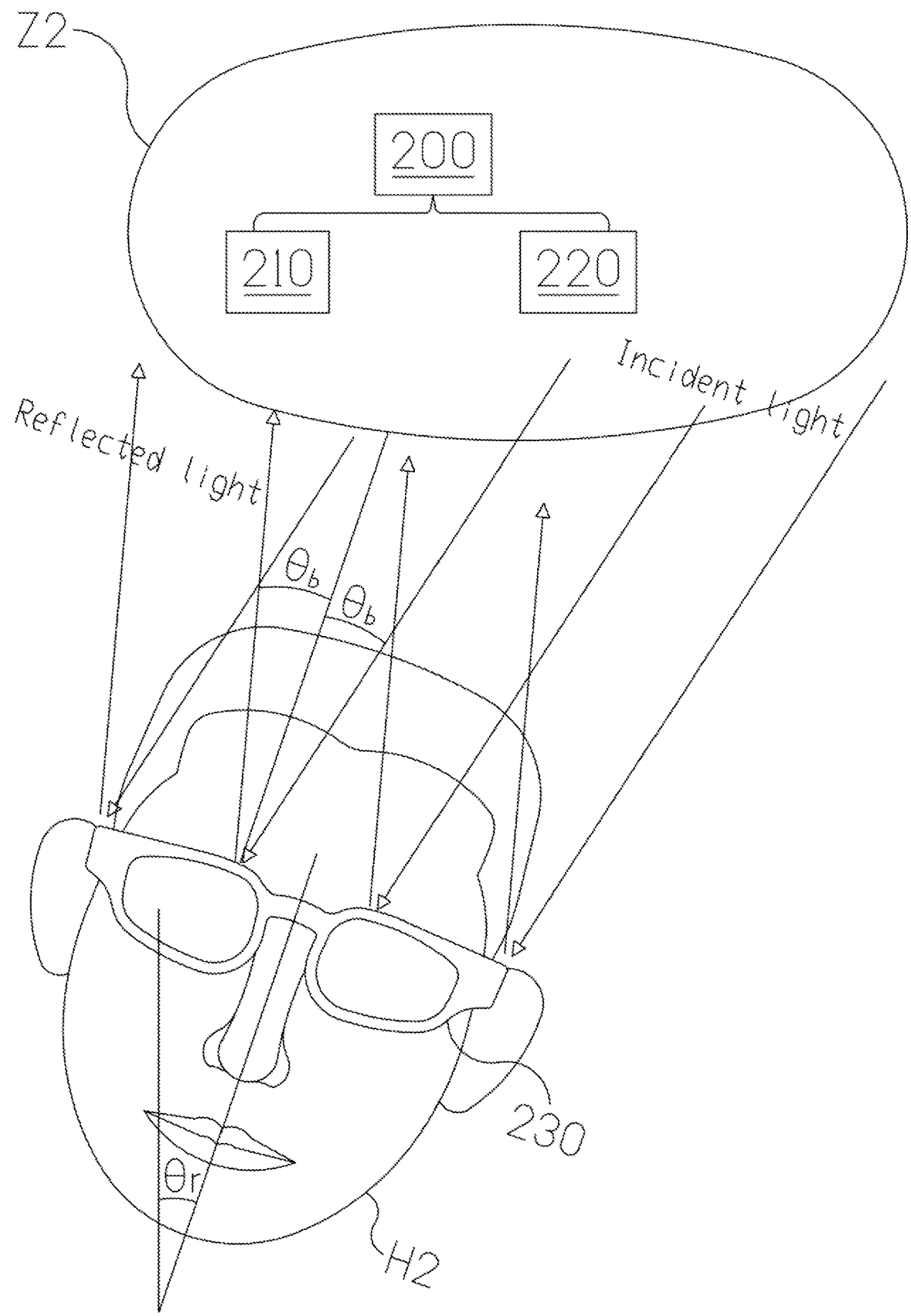

In another embodiment as depicted in FIG. 3B, assuming the person turns his/her head right with an angle of $\theta_r$, and at the position of H2, the position of the surface of the glasses 230 and the relative positions of the light source 220, the image sensor 210 and the glasses 230 also change. Accordingly, the incident angle $\theta_b$ could be calculated according to the distance between the image sensor 210 and the light source 220 (which is usually fixed and on the same plane) and the distance between the glasses 230 and the camera plane. Therefore, based on the position and the size of the glasses 230 and the distance between the image sensor 210 and the light source 220 (or the positions of the image sensor 210 and the light source 220, or the angle $\theta_b$), the forbidden region Z2 could be defined.

Figure 3C:
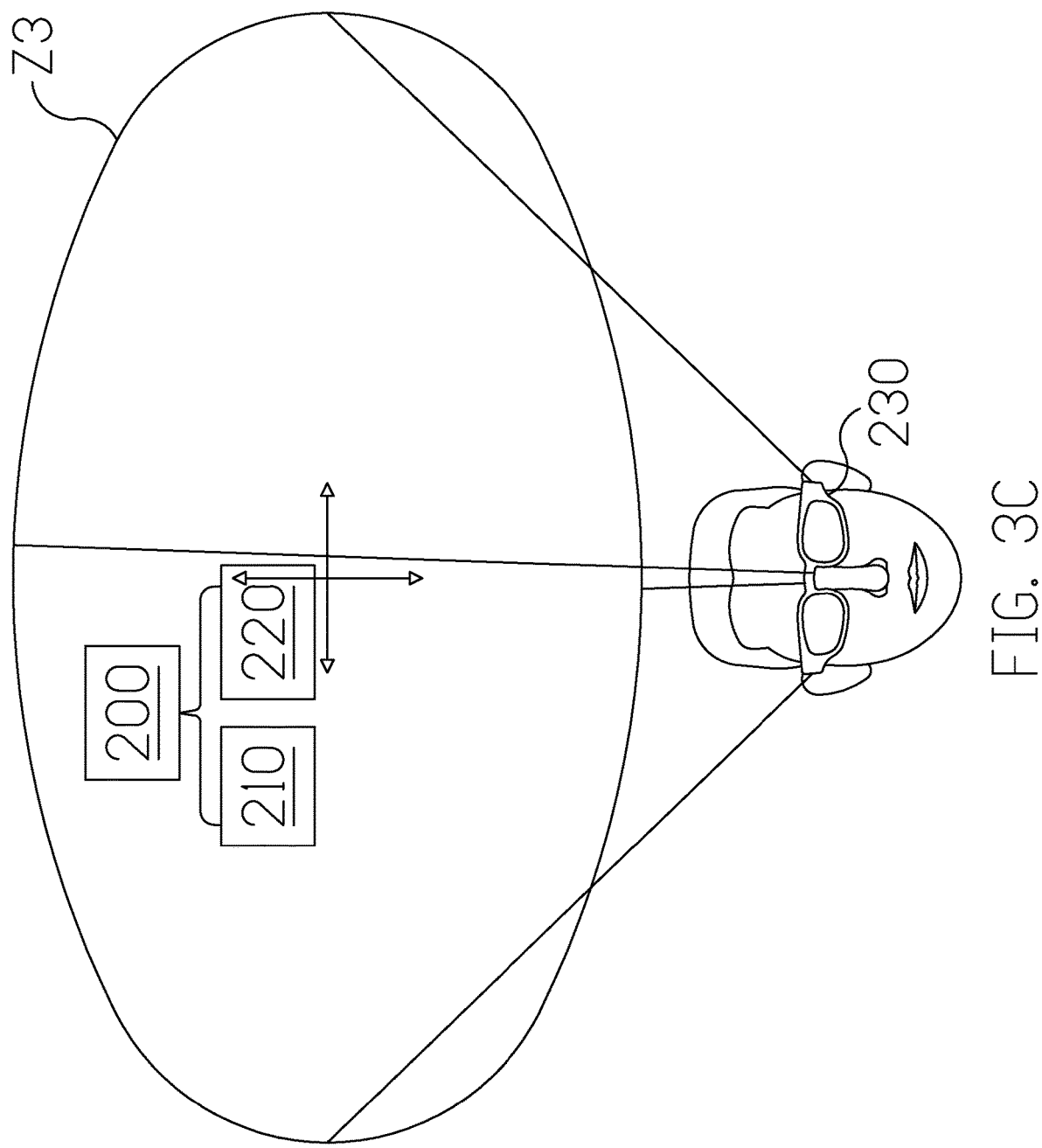

Similarly, the movement of the person's head in yaw, pitch and roll axes may also be considered when it comes to the determination of forbidden zones. As shown in FIG. 3C, the forbidden region Z3 is defined according to the yaw, pitch and roll angle of the person's head.

Ideally, the camera system (including the image sensor and the light source) should not be disposed in the forbidden region. However, in light of the limited space inside a vehicle, placing the camera system within the forbidden zones could be inevitable.

Figure 4:
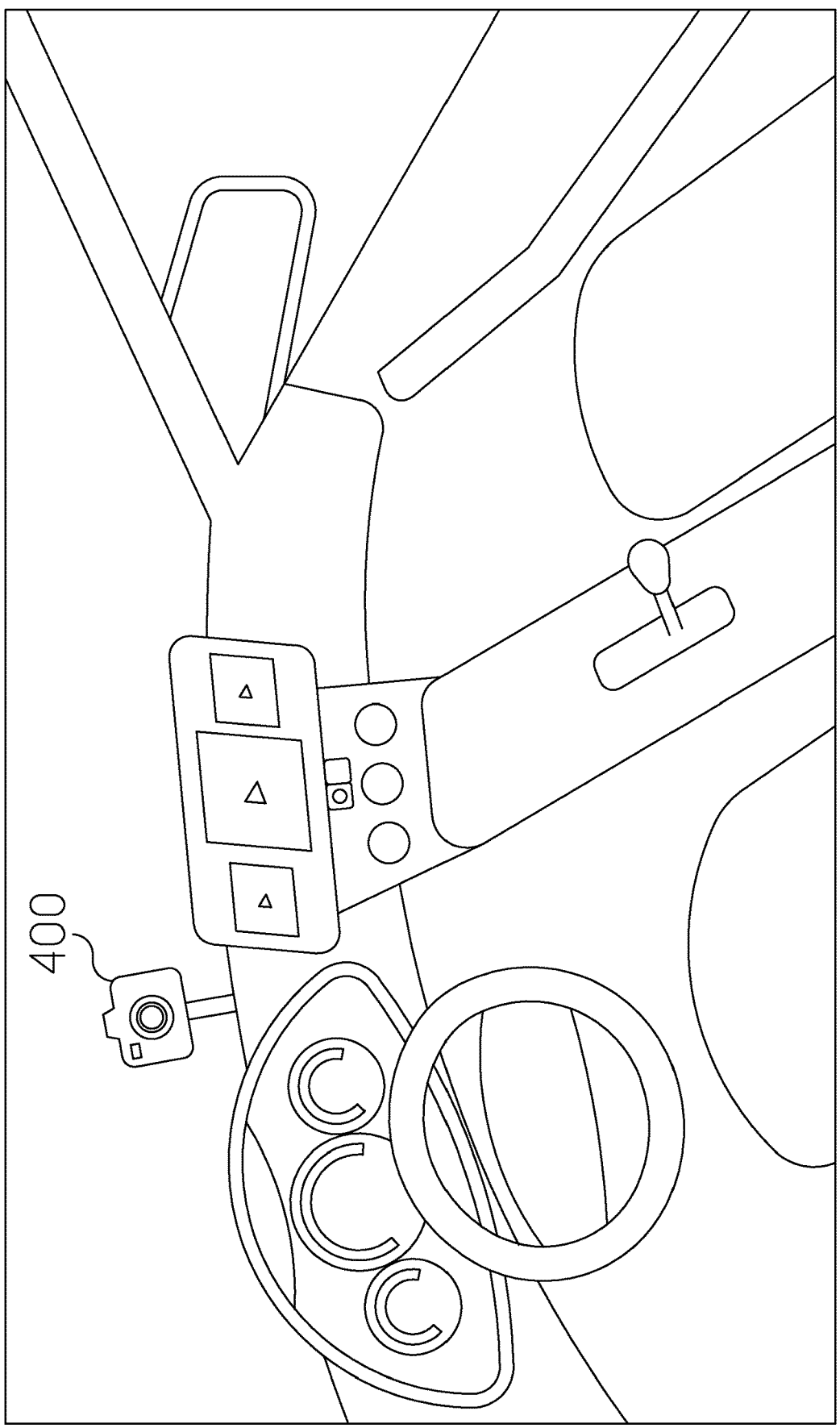
FIG. 4 is a schematic diagram shows a camera system disposed in a vehicle according to an embodiment of the present disclosure.

FIG. 4 is a schematic diagram shows a camera system 400 disposed in a vehicle according to an embodiment of the present disclosure. As shown in FIG. 4, the camera system 400 is disposed in front of the driver seat, and configured to capture images of a driver. The captured images may be relied upon to infer the driver's eye status, or the driver's gaze and the results are adopted to determine the driver's behaviors and/or physical conditions (such as the degrees of fatigue, drowsiness, inattention, and distraction). It is critical to obtain the accurate eyes status. As mentioned, when the driver wears glasses, the eyes region and eyes status may not be properly identified from the captured images because of glare caused by light reflections.

Figure 5:
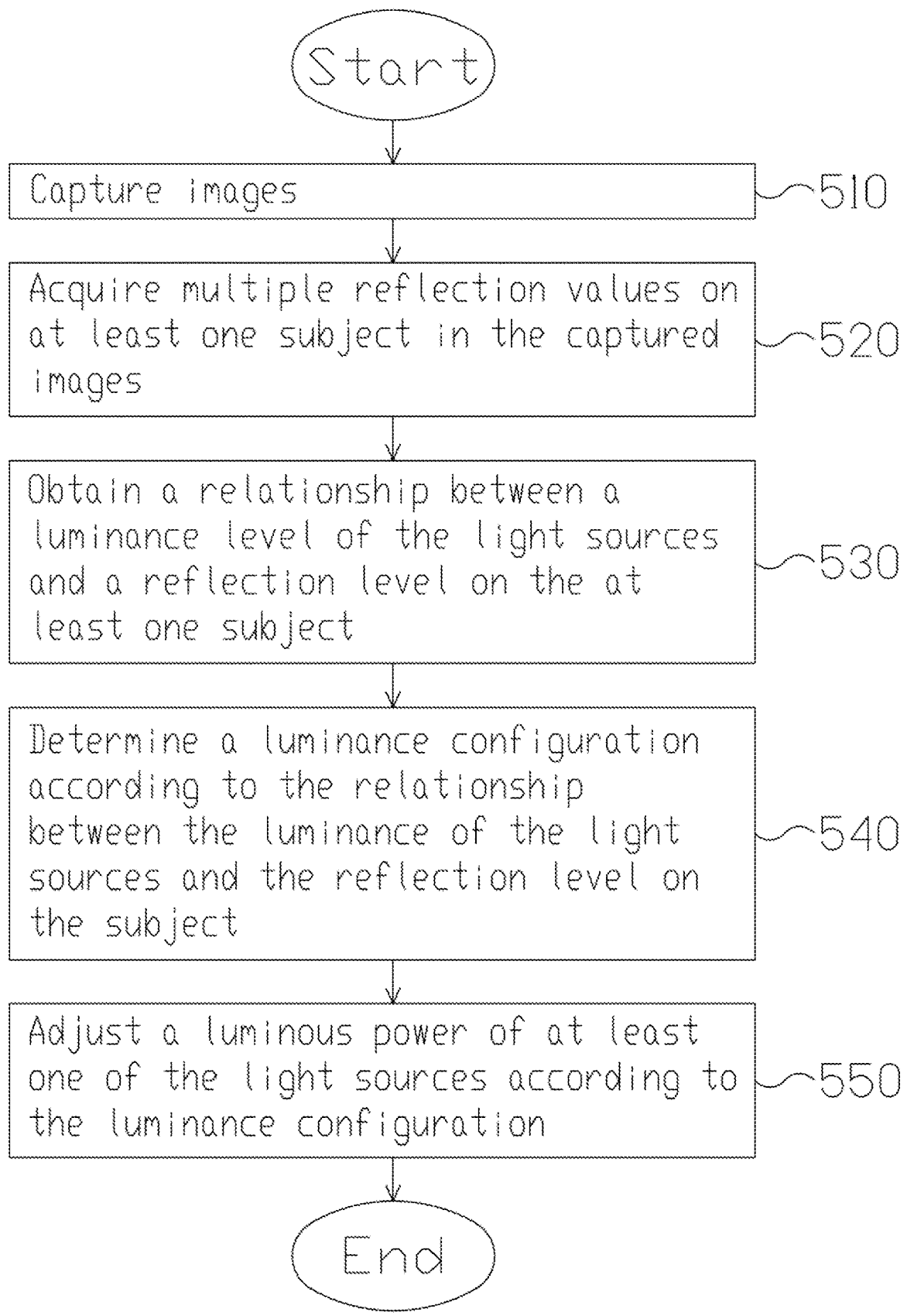
FIG. 5 is a flowchart of a method for configuring light source of a camera system according to an embodiment of the present disclosure.

In the present disclosure, another way to eliminate the glare is to dynamically dim the light sources. FIG. 5 is a flowchart of a method for configuring light source of a camera system according to an embodiment of the present disclosure. The method includes the following actions. In action 510, the image sensor captures multiple images. In action 520, the processing unit acquires multiple reflection values on at least one subject in the captured images. In action 530, the processing unit obtains a relationship between a luminance level of the light sources and a reflection level on the at least one subject. In action 540, the processing unit determines a luminance configuration according to the relationship between the luminance of the light sources and the reflection level on the subject. In action 550, the processing unit adjusts a luminous power of at least one of the light sources according to the luminance configuration.

Figure 6:
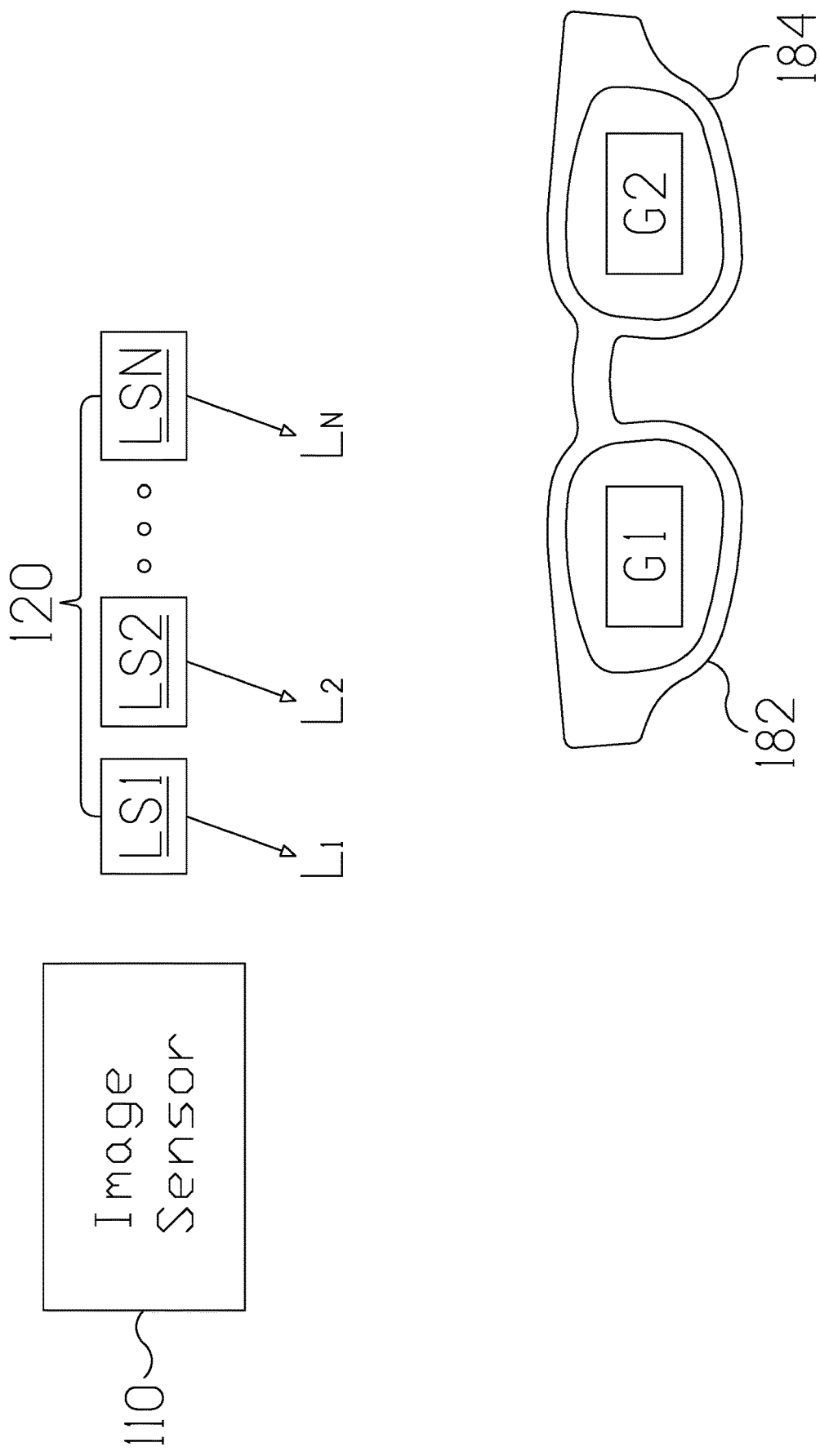
FIG. 6 is a schematic diagram of the configuration of the camera system according to an implementation of the present disclosure.

The method will be described as follow based on a scenario where the camera system 100 is installed in a vehicle. However, the present disclosure is not limited thereto. FIG. 6 is a schematic diagram of the configuration of the camera system 100 according to an implementation of the present disclosure. As shown in FIG. 6, the light sources 120 may include multiple light sources $L_1$-$L_N$. Unlike the conventional arrangement described above, the light sources $L_1$-$L_N$ may be scattered in a vehicle. Additionally, the luminous powers of the light sources LS1-LSN are individually configurable. By dynamically adjusting the luminous power of each light source $L_1$-$L_N$, the glare may be reduced or avoided on the captured images. In order to find the appropriate configuration of luminous powers given to the light sources LS1-LSN, the relationship between the luminance level of the light sources and the reflection levels on the images must be obtained beforehand.

For instance, the relationship between the luminance level of the light sources and the reflection level on the subject in the images could be represented by the equation (1) shown below:

$$\begin{pmatrix} b_1 \\ b_2 \end{pmatrix} + \begin{pmatrix} a_{11} & a_{12} & \cdots & a_{1N} \\ a_{21} & a_{22} & \cdots & a_{2N} \end{pmatrix} \times \begin{bmatrix} L_1 \\ \vdots \\ L_N \end{bmatrix} = \begin{pmatrix} G1 \\ G2 \end{pmatrix}, \quad (1)$$

where $L_1$-$L_N$ represents the luminous powers of the light sources LS1-LSN, G1 and G2 are the reflection values measured on the subject (e.g., glasses 182 and 184), and $b_1$, $b_2$, $a_{11}$-$a_{1N}$, $a_{21}$-$a_{2N}$, are coefficients. It should be noted that in the assumption, $L_1$-$L_N$ are non-negative real numbers, G1 and G2 are real numbers and 0≤G1≤1, 0≤G2≤1, and $b_1$, $b_2$, $a_{11}$-$a_{1N}$, $a_{21}$-$a_{2N}$, are real numbers.

In one embodiment, the relationship could be obtained by performing experiments applying various sets of luminous powers $L_1$-$L_N$ and measuring the reflection values captured by the image sensor 110. Particularly, the processing unit 130 configures the light sources with multiple sets of luminance values, where each set of luminance values is applied to at least one light source at a same time. Assuming the light sources LS1-LSN are placed under a particular arrangement and applied with a set of luminous powers $L_1$-$L_N$, the reflection values of G1 and G2 that appear on the glasses 182 and 184 are measured, respectively. In one implementation, the reflection value (e.g., G1 or G2) is 0 if there is no reflective light observed on the subject (182 or 184); otherwise the value is greater than 0 to indicate the occurrence of a reflective light. In another implementation, the reflection level could be determined by the degree of the brightness measured on the subject (glasses 182 or 184). In yet another implementation, the reflection level may be determined by whether the subject (e.g., the eye, the iris, or the pupil) is blocked or could not be identified. For instance, the reflection level could be represented by the ratio of the size of the glare to the size of the subject. Afterwards, the processing unit 130 calculates the relationship according to the multiple sets of luminance values and the reflection values. Based on the experimental data, the coefficients $b_1$, $b_2$, $a_{11}$-$a_{1N}$, $a_{21}$-$a_{2N}$ and therefore the relationship (equation) can substantially obtained based on the current arrangement of the light sources LS1-LSN.

In another embodiment, the relationship could be obtained by performing deep-learning, machine learning or similar techniques familiar by the skilled persons and acquired beforehand. For instance, the relationship could be represented by another equation (2): B+A×L=G, where L is the luminance level of the light sources, G is the reflection level on the subject, and B and A are matrices or functions substantially acquired by the machine learning or deep-learning or similar techniques.

In addition, the relationship (equation) based on different arrangements of the light sources LS1-LSN could be obtained through similar process.

After the relationship (equation) is obtained, the processing unit 130 could obtain the suitable luminous power of each light source LS1-LSN that reduce or minimize the reflection values and configure the light source LS1-LSN accordingly to reduce the glare. As such, the camera system 100 may reduce the glare by dimming the light source 120 even though the camera system 100 is disposed in the region where the glare might be induced.

Since the camera system 100 can dynamically adjust the luminous powers of the light sources based on the reflection level of the reflective lights, it would also work even if the person changes the head position. For instance, the processing unit 130 could keep tracking the driver's actions (including head movement or eye movement) and the corresponding reflection values and thus, even if the driver moves his head or eyes, the processing unit 130 could adjust the luminous power of the light source LS1-LSN to reduce the glare. In one implementation, the relationship (equation) is established further according to the driver's actions (including head movement or eye movement).

In some embodiments, even if the glare is not caused by the light sources of the camera system 100 but other environment light or ambient light such as sunlight, ceiling lights, and lamps, the camera system 100 can also eliminate it by dynamically adjusting the luminous powers of the light sources. Specifically, the processing unit 130 apply various sets of luminous powers $L_1$-$L_N$ and measure multiple reflection values on the subject. Next, the processing unit 130 obtain the relationship between the luminance level of the light sources and the reflection level on the subject based on the experimental data. Based on the relationship, the processing unit 130 obtain the suitable luminous power of each light source LS1-LSN that minimize the reflection values and configure the light source LS1-LSN accordingly to reduce the glare.

It should be noted that, although that the above example is illustrated with respect to an image capturing a person wearing glasses. However, the present disclosure is not limited thereto. Reflection from other objects (e.g., glass objects, windows, mirrors, and even water) could also cause glare. Hence, as long as the identification of a subject is affected by the glare, the processing unit 130 adjusts the luminous power of the light sources according to the luminance configuration.

In one implementation, the processing unit 130 identifies the subject from the captured images and determine whether a glare is on the subject. For instance, the processing unit 130 identifies the eyes region of a person from the captured images, and determine whether there is a glare on the eye region. When it is determined that the glare is on the eye region, the processing unit 130 adjusts the luminous power of the light sources according to the luminance configuration. As a result, the light sources could be configured with proper luminous powers such that the subject could be properly identified.

In another implementation, the glare may be too large or too strong that the subject may not be detected at all. Thus, as long as a glare is detected on the captured image, the processing unit 130 adjusts the luminous power of the light sources according to the luminance configuration. In addition, the processing unit 130 may further determine whether the identification of the subject is affected by the glare according to, for example, the position of the glare in the images or the size of the glare. When it is determined that the identification of the subject is affected by the glare, the processing unit 130 adjusts the luminous power of the light sources according to the luminance configuration.

It should be noted that, according to the relationship (equation), there might be multiple configuration of luminous power $L_1$-$L_N$ (solution of the equation) that reduce or minimize the reflection values G1 and G2 (glare). In one implementation, the luminance configuration is determined according to a condition that an overall luminance exceeds a threshold. In other words, the overall luminous power of the light sources LS1-LSN is adjusted such that the captured image is sufficiently bright enough for any subsequent image processing and/or recognition. For instance, the overall luminous power $L_A$ should satisfy the following condition (3): $|L_A|=\sqrt{L_1^2+L_2^2+...+L_N^2}>BS_{th}$, where $L_1$-$L_N$ are the luminance powers of the light sources, and they are non-negative real numbers; and $BS_{th}$ is the minimum luminous power that a scene requires and is a non-negative real number.

In another implementation, the luminance configuration is determined according to a condition that an overall brightness on the captured images exceeds a threshold which is the minimum brightness of the images for any subsequent image processing and/or recognition. For instance, the relationship between the luminance level of the light sources and a brightness level on the captured images could be represented by the equation (4): C×L=B, where L is the luminance level of the light sources, B is the brightness level on the captured images, and C is matrix or function substantially acquired by the machine learning or deep-learning or similar techniques. Alternatively, the matrix or function C is deduced by experiments.

In yet another implementation, the luminance configuration is determined according to a condition that the reflection level on the at least one subject is reduced. For instance, when the reflection level indicating the degree of the brightness measured on the subject is reduced to a certain level, the processing unit 130 may identify the subject properly. Alternatively, when the reflection level represented by the ratio of the size of the glare to the size of the subject is reduced, the processing unit 130 may identify the subject properly.

Figure 7A:
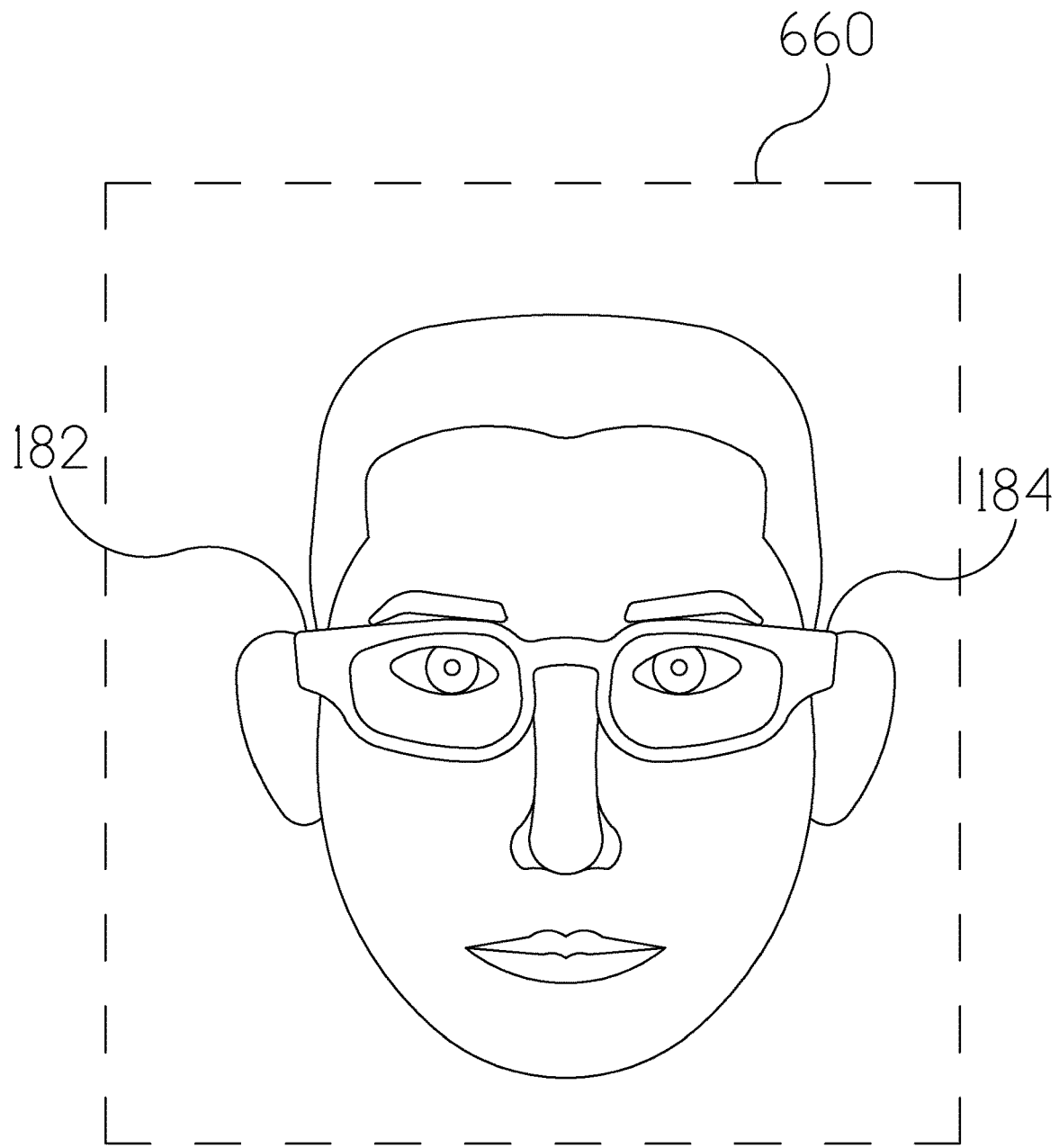
FIGS. 7A and 7B are schematic diagrams of an image captured by the camera system according to an implementation of the present disclosure.
Figure 7B:
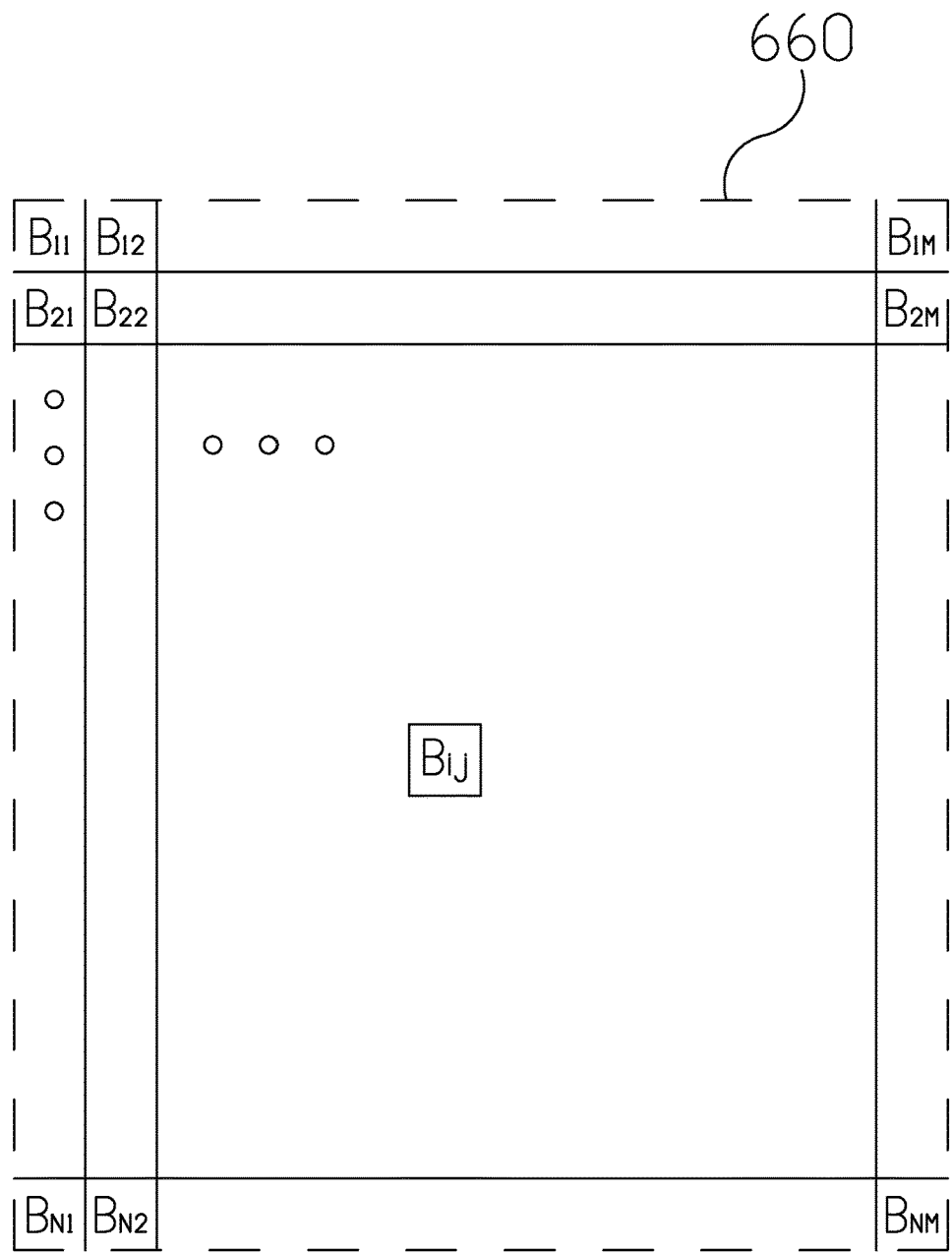

In some other embodiments, the uniformity of brightness is further considered. FIGS. 7A and 7B are schematic diagrams of an image captured by the camera system 100 according to an implementation of the present disclosure. As shown in FIG. 7A, a bounding box 660 of a person's face in the image is detected. As shown in FIG. 7B, the bounding box 660 may be divided into multiple regions (e.g., N×M, where N, M are positive integers). The brightness value of each region (e.g., $B_{ij}$) is measured. In order to make the captured image free of obvious hotspots or unintended dark areas, the processing unit 130 may take a further step to adjust the luminance powers of the light source LS1-LSN to minimize the brightness divergence formed in each of the regions.

For instance, the relationship between the luminance level of the light sources and a brightness level on the captured images is represented by the following equation (5):

$$\begin{pmatrix} c_{11} & \cdots & c_{1N} \\ \vdots & \ddots & \vdots \\ c_{(N*M)1} & c_{(N*M)2} & \cdots & c_{(N*M)N} \end{pmatrix} \times \begin{bmatrix} L_1 \\ \vdots \\ L_N \end{bmatrix} = \begin{bmatrix} B_{11} \\ \vdots \\ B_{N*M} \end{bmatrix},$$

where $L_1$-$L_N$ represents the luminance powers of the light sources LS1-LSN, $B_{11}$, $B_{12}$, ..., $B_{1M}$, $B_{21}$, $B_{22}$, ..., $B_{2M}$, ..., $B_{31}$, ..., $B_{ij}$, ..., $B_{N1}$, ... $B_{NM}$ are brightness values of each region and is a real number and $0<B_{ij}\leq 1$, and $c_{11}$, ..., $c_{(N*M)1}$, $c_{(N*M)2}$, ..., $c_{(N*M)N}$ are real numbers.

The relationship between the luminance level of the light sources and the brightness level on the captured images could be obtained by performing experiments. Specifically, apply various sets of luminous powers $L_1$-$L_N$ and measure multiple brightness values of each region (e.g., $B_{ij}$). Next, obtain the relationship between the luminance level of the light sources and the brightness level on the captured images based on the experimental data. Alternatively, the relationship could be obtained by performing deep-learning, machine learning or similar techniques familiar by the skilled persons and acquired beforehand.

In one implementation, the luminance configuration is determined according to a condition that a brightness uniformity on the captured images is below a threshold. For example, the brightness gradient BG may be represented by the following equation (6):

$$BG=(B_{11}-B_{12})^2+(B_{12}-B_{13})^2 \ldots +(B_{N*M-1}-B_{NM})^2+ (B_{11}-B_{21})^2+(B_{21}-B_{31})^2+ \ldots +(B_{(N-1)M}-B_{NM})^2,$$

where $B_{11}$, ..., $B_{NM}$ are brightness values of each region and is a real number, and $0<B_{ij}\leq 1$.

After the relationship (equation) is obtained, the processing unit 130 could obtain the suitable luminous power of each light source LS1-LSN such that the brightness gradient BG on the captured images is reduced or minimized and then configure the light source LS1-LSN accordingly to thus make the brightness more uniform.

Based on the above, the present disclosure provides a camera system, a method for configuring light sources of a camera system, and a vehicle. By dynamically dimming the light sources, the glare could be reduced even though the camera system and the light sources are disposed in the forbidden regions where glare may occur. Moreover, the luminous power of the light sources could also be dynamically adjusted based on the driver's instant position. In addition, another advantage brought by adjustable light sources is the quality of the captured images are enhanced with respect to the brightness and uniformity, and therefore any image recognitions based upon are more accurate.

Based on the above, several camera systems, methods for configuring light sources of a camera system, and vehicles are provided in the present disclosure. The implementations shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A camera system, comprising:
an image sensor configured to capture a plurality of images;
a plurality of light sources; and
a processing unit coupled to the image sensor and the light sources, wherein the processing unit is configured to perform instructions for:
acquiring a plurality of reflection values on at least one subject in the captured images;
obtaining a relationship between a luminance level of the light sources and a reflection level on the at least one subject;
determining a luminance configuration according to the relationship between the luminance level of the light sources and the reflection level on the at least one subject; and
adjusting a luminous power of at least one of the light sources according to the luminance configuration.

2. The camera system of claim 1, wherein the processing unit is further configured to perform instructions for:
identifying the at least one subject from the captured images; and
determining whether a glare is on the at least one subject;
wherein the luminous power of the at least one of the light sources is adjusted according to the luminance configuration when it is determined that the glare is on the at least one subject.

3. The camera system of claim 1, wherein the processing unit is further configured to perform instructions for:
determining whether a glare is on at least one of the captured images;
wherein the luminous power of the at least one of the light sources is adjusted according to the luminance configuration when an identification of the at least one subject is affected by the glare.

4. The camera system of claim 1, wherein the processing unit is further configured to perform instructions for:
configuring the light sources with multiple sets of luminance values, wherein each set of luminance values is applied to at least one light source at a same time;
wherein each reflection value on the at least one subject is acquired when each set of luminance values is applied to the at least one light source at the same time; and the relationship is calculated according to the multiple sets of luminance values and the reflection values.

5. The camera system of claim 1, wherein the luminance configuration is determined according to a condition that an overall luminance exceeds a threshold.

6. The camera system of claim 1, wherein the luminance configuration is determined according to a condition that an overall brightness on the captured images exceeds a threshold.

7. The camera system of claim 1, wherein the luminance configuration is determined according to a condition that the reflection level on the at least one subject is reduced.

8. The camera system of claim 1, wherein the luminance configuration is determined according to a condition that a brightness uniformity on the captured images is below a threshold.

9. The camera system of claim 8, wherein the processing unit is further configured to perform instructions for:
obtaining multiple brightness values on multiple regions of the captured images, wherein each brightness value is obtained corresponding to each region on each captured image; and
obtaining a relationship between the luminance level of the light sources and a brightness level on the captured images;
wherein the luminance configuration is further determined according to a condition that a brightness gradient on the captured images is reduced.

10. A method for configuring light source of a camera system, comprising:
capturing, by an image sensor, a plurality of images;
acquiring, by a processing unit, a plurality of reflection values on at least one subject in the captured images;
obtaining, by the processing unit, a relationship between a luminance level of the light sources and a reflection level on the at least one subject;
determining, by the processing unit, a luminance configuration according to the relationship between the luminance of the light sources and the reflection level on the subject; and
adjusting, by the processing unit, a luminous power of at least one of the light sources according to the luminance configuration.

11. The method of claim 10, further comprising:
identifying, by the processing unit, the at least one subject from the captured images; and
determining, by the processing unit, whether a glare is on the at least one subject;
wherein the luminous power of the at least one of the light sources is adjusted according to the luminance configuration when it is determined that the glare is on the at least one subject.

12. The method of claim 10, further comprising:
determining, by the processing unit, whether a glare is on at least one of the captured images;
wherein the luminous power of the at least one of the light sources is adjusted according to the luminance configuration when an identification of the at least one subject is affected by the glare.

13. The method of claim 10, further comprising:
configuring, by the processing unit, the light sources with multiple sets of luminance values, wherein each set of luminance values is applied to at least one light source at a same time;
wherein each reflection value on the at least one subject is acquired when each set of luminance values is applied to the at least one light source at the same time; and the relationship is calculated according to the multiple sets of luminance values and the reflection values.

14. The method of claim 10, wherein the luminance configuration is determined according to a condition that an overall luminance exceeds a threshold.

15. The method of claim 10, wherein the luminance configuration is determined according to a condition that an overall brightness on the captured images exceeds a threshold.

16. The method of claim 10, wherein the luminance configuration is determined according to a condition that the reflection level on the at least one subject is reduced.

17. The method of claim 10, wherein the luminance configuration is determined according to a condition that a brightness uniformity on the captured images is below a threshold.

18. The method of claim 17, further comprising:
obtaining, by the processing unit, multiple brightness values on multiple regions of the captured images, wherein each brightness value is obtained corresponding to each region on each captured image; and
obtaining, by the processing unit, a relationship between the luminance level of the light sources and a brightness level on the captured images;
wherein the luminance configuration is determined according to a condition that a brightness gradient on the captured images is reduced.

19. A vehicle, comprising:
an image sensor configured to capture a plurality of images;
a plurality of light sources; and
a processing unit coupled to the image sensor and the light sources, wherein the processing unit is configured to perform instructions for:
acquiring a plurality of reflection values on at least one subject in the captured images;
obtaining a relationship between a luminance level of the light sources and a reflection level on the at least one subject;

determining a luminance configuration according to the relationship between the luminance level of the light sources and the reflection level on the at least one subject; and adjusting a luminous power of at least one of the light sources according to the luminance configuration.

20. The vehicle of claim 19, wherein the processing unit is further configured to perform instructions for:

determining whether a glare is on at least one of the captured images;

wherein the luminous power of the at least one of the light sources is adjusted according to the luminance configuration when an identification of the at least one subject is affected by the glare.

* * * * *